United States Patent
Agarwal et al.

(10) Patent No.: US 10,992,778 B2
(45) Date of Patent: *Apr. 27, 2021

(54) CALLEE CONDITION BASED COMMUNICATION WITH MOBILE DEVICES

(71) Applicant: International Business Machines Corporation, Armonk, NY (US)

(72) Inventors: Kanak B. Agarwal, Austin, TX (US); Patrick J. Bohrer, Austin, TX (US); Ahmed Gheith, Austin, TX (US); Michael D. Kistler, Austin, TX (US); Ramakrishnan Rajamony, Austin, TX (US); Brian L. White Eagle, Austin, TX (US); James Xenidis, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,995

(22) Filed: Oct. 3, 2018

(65) Prior Publication Data

US 2020/0145514 A1    May 7, 2020

Related U.S. Application Data

(63) Continuation of application No. 14/846,911, filed on Sep. 7, 2015, now Pat. No. 10,129,366.

(51) Int. Cl.
G06F 15/16    (2006.01)
H04L 29/08    (2006.01)
(Continued)

(52) U.S. Cl.
CPC ............ H04L 67/327 (2013.01); H04L 51/04 (2013.01); H04L 51/20 (2013.01); H04W 4/02 (2013.01); H04W 4/30 (2018.02); *H04L 51/38* (2013.01)

(58) Field of Classification Search
CPC . H04L 65/1016; H04L 65/1046; H04L 67/24; H04L 67/306; H04L 67/327;
(Continued)

(56) References Cited

U.S. PATENT DOCUMENTS

2009/0209241 A1* 8/2009 Karaoguz ......... H04L 29/06027
455/415
2009/0213844 A1* 8/2009 Hughston ........... H04M 3/4872
370/352

OTHER PUBLICATIONS

List of IBM patents treated as related, Appendix P, 2018.

* cited by examiner

*Primary Examiner* — Wing F Chan
*Assistant Examiner* — Andrew Woo
(74) *Attorney, Agent, or Firm* — Garg Law Firm, PLLC; Rakesh Garg; Brian Welle

(57) ABSTRACT

For location-based communication with mobile devices, a set of callee conditions is received at a caller's device, which has to be satisfied by a callee according to information descriptive of a condition of the callee. The state information is distinct from the location and a time of the callee's presence at the location. An evaluation is made that each device associated with each potential callee in a first subset has been present at the location at a specified time, and that each potential callee in the first subset satisfies the set of callee conditions. At the caller's device, an instruction is received for making a telecommunication call to a device of
(Continued)

a potential callee in a first subset. The call is initiated from the caller's device to mobile devices associated with the first subset of potential callees.

20 Claims, 8 Drawing Sheets

(51) Int. Cl.
    *H04L 12/58*         (2006.01)
    *H04W 4/02*          (2018.01)
    *H04W 4/30*          (2018.01)
(58) Field of Classification Search
    CPC .............. H04L 29/06027; H04L 51/20; H04M 1/72572; H04M 3/42365; H04W 4/02
    USPC ................................................ 709/204, 223
    See application file for complete search history.

CALLEE CONDITION BASED COMMUNICATION WITH MOBILE DEVICES

TECHNICAL FIELD

The present invention relates generally to a method, system, and computer program product for telecommunications with mobile devices. More particularly, the present invention relates to a method, system, and computer program product for callee condition based communication with mobile devices.

BACKGROUND

Mobile devices proliferate all aspects of daily life and are usable for telecommunications. Users with mobile devices frequently travel to a variety of places for a variety of purposes. It is conceivable that regardless of what or where a place might be, if there is a human user in that place, it is very likely that the user has a mobile device on the user's person or otherwise available to the user with which to establish a telecommunications call (hereinafter, "call").

A call is any suitable method of telecommunication, including but not limited to audio telephonic communications, video telecommunications, textual messaging, taptically or haptically telecommunicating information, and generally telecommunication of data in these and other forms. Any type of mobile device can be used for a call. A mobile device is capable of relocating from one location to another as the user associated with the mobile device moves from one location to another. As some non-limiting examples, the mobile device can take the form of a cellular phone, a smartphone device, a tablet computer, a portable computing platform, a wearable device, and the like.

A typical call begins with a calling user (hereinafter, "caller") dialing a number associated with a mobile device that is associated with a called user (hereinafter, "callee"). A service provider connects the call between the caller's telecommunication device and the callee's mobile device using one or more service provider systems. In some cases, the caller selects a callee's name, such as from a phonebook or a similar contacts management application, and the caller's device calls the number stored relative to the callee's name in the phonebook.

In some cases, a caller may not know the callee or a callee's number. A caller can use a directory service, whereby the caller identifies the intended callee by name, address, or both, and the directory service provides the callee's number to the caller, connects the call between the caller and the callee, or both.

The illustrative embodiments recognize that for the directory service to work using only the address, the callee's number has to be permanently associated with that address, even if the number is assigned to a mobile device. In other words, if a callee has to be reached only by knowing the callee's address, the callee's number must be unchangeably associated with the address, even if the device associated with the number is mobile.

The illustrative embodiments recognize that presently, there is no available method by which a caller could call any callee who may be present at a given location at a given time. In other words, if a caller were interested in calling anyone who may be present at or around a specified geographical location, during a given period, the caller will be able to call that location only if either a number is permanently associated with that location and the caller calls that number, or the caller calls a specific known callee whose presence at the location is a known fact to the caller.

The illustrative embodiments recognize that such a deficiency in the present telecommunications systems is severely limiting in many circumstances. The illustrative embodiments recognize that under certain circumstances, a caller may want to call any callee who not only is present at a location at a given time, but also satisfies one or more other conditions. Such a condition need not be related to a time of the presence of the callee at the location. Such a condition also need not be related to the location where the callee is present.

For example, a condition may be that the callee not be intoxicated while the callee is present at a location at a time. Another example condition may be that the callee should have a certain access privilege to a space, object, or data. As can be seen from these examples, these are conditions on a state or characteristic of the callee, regardless of the location and time of the unknown callee, for calling the unknown callee. Hereinafter, these types of conditions that qualify a callee on bases other than the location of the callee and a time at which the callee is present at that location are called callee conditions.

In some cases, a callee condition can be an event. For example, an event-type callee condition may be that the callee should have finished (or started) an activity—the finishing (or starting) of the activity being an event, which forms the callee condition and qualifies the callee. Similarly, another example event-type callee condition may be that the callee should occupy a certain position-range in a queue, in other words, partially completed an activity to a specified degree—the partial completion of the activity to the specified degree being an event, which forms the callee condition and qualifies the callee.

These examples of callee conditions are not intended to be limiting. From this disclosure, those of ordinary skill in the art will be able to conceive many other callee conditions their types, and the same are contemplated within the scope of the illustrative embodiments.

Different callees may be present at a location at different times. Thus, a callee has to satisfy a two-part selection method to qualify as a callee to receive the call that is directed to the location—(i) the callee has to be someone who is present at a location and time identified by a caller, and (ii) the callee has to satisfy a callee condition. Furthermore, a callee condition may be a set of conditions, from which the qualification process requires that the callee satisfy at least a subset of callee conditions.

For example, a set of callee condition may include one callee condition that the callee have at least a specified level of access to a space, object, or data, as described earlier, and another callee condition that the callee have at least a membership or a certain rank in a team or organization. Many other examples of such sets of callee conditions will become conceivable from this disclosure to those of ordinary skill in the art, and the same are contemplated within the scope of the illustrative embodiments.

Within the scope of the illustrative embodiments, any number of callee conditions can be included in a set of callee conditions. Furthermore, a callee condition in a set can depend on another callee condition in the set, e.g., in a daisy-chained manner. For example, consider the two callee conditions in the above example set. The two conditions can be in a dependent relationship such that a callee has to first satisfy the callee condition that the callee have at least a membership or a certain rank in a team or organization. Once a suitable callee has been identified, who is present at the given location at the given time, and who has at least the membership or the certain rank in a given team or organization, then that callee has to be further qualified by determining whether that callee has at least the specified level of access to the specified space, object, or data.

Different callee conditions in a set of callee conditions can be configured in a simple dependency chain as in the example above, or in a dependency hierarchy of greater complexity. For example, a callee condition in a set can depend upon the satisfaction of more than one other callee conditions in the set, upon different degrees of satisfaction of one or more different callee conditions in the set, upon the satisfaction of any of several alternative callee conditions in the set, upon different degrees of satisfaction of one or more alternative callee conditions in the set, and many other possible variations of dependency hierarchy. These and other similarly purposed hierarchies of dependencies amongst the callee conditions in a set of callee conditions are contemplated within the scope of the illustrative embodiments.

The illustrative embodiments recognize that presently available methods of calling are severely limited in establishing a call in these and other similar circumstances. Thus, a solution for calling one or more transient callees or callee-associated mobile devices based on a mobile device's location and a condition being satisfied is needed and will be beneficial.

SUMMARY

The illustrative embodiments provide a method, system, and computer program product for callee condition based communication with mobile devices. An embodiment includes a method for location-based communication with mobile devices. The embodiment receives, at a device associated with a caller, a set of callee conditions to call a location. A callee condition in the set of callee conditions has to be satisfied by a callee using a state information of the callee. The state information of the callee includes information that is descriptive of a condition of the callee. The state information is distinct from the location and a time of the callee's presence at the location. The location being a place where different callees with different mobile devices are present at different times. The embodiment evaluates that each mobile device associated with each potential callee in a first subset of potential callees has been present at the location at a specified time. The embodiment further evaluates that each potential callee in the first subset of potential callees satisfies the set of callee conditions. The embodiment receives, at the device associated with the caller, an instruction for making a telecommunication call to a mobile device of a potential callee in a first subset of a set of potential callees. The embodiment initiates, using a processor and a memory in the device associated with the caller, the telecommunication call to mobile devices associated with the first subset of potential callees. Thus, the embodiment allows connecting a caller to a callee, from a dynamic group of callees, by only knowing a location, where no identifier may be statically associated with the location.

Another embodiment further configures the set of callee conditions in a dependency hierarchy, wherein the dependency hierarchy provides that a dependent callee condition in the set of callee conditions is to be satisfied when a primary callee condition in the set of callee conditions has been satisfied. The embodiment sends as a first step, to the mobile devices associated with set of potential callees, the primary callee condition. The embodiment determines that a second subset of potential callees satisfies the primary callee condition but a third subset of potential callees fails to satisfy the primary callee condition. The embodiment sends as a second step, responsive to the determining, only to the mobile devices associated with second subset of potential callees, the dependent callee condition. The embodiment selects, as the first subset of potential callees, those potential callees from the second subset who satisfy the dependent callee condition. Thus, the embodiment allows connecting a caller to a qualified callee, from a dynamic group of callees, by qualifying the callee using multi-step callee conditions.

In another embodiment, the sending as the first step occurs from the device associated with the caller. Thus, the embodiment allows connecting a caller to a qualified callee, from a dynamic group of callees, by qualifying the callee from the caller's device.

Another embodiment further transmits the set of callee conditions to a server application in a service provider's system, wherein the sending as the first step occurs from the server application. Thus, the embodiment allows connecting a caller to a qualified callee, from a dynamic group of callees, by qualifying the callee from a service provider's system.

Another embodiment further causes a mobile device of a potential callee in the first subset to evaluate the potential callee in the first subset of potential callees satisfies the primary callee condition and the dependent callee condition, the causing being a part of the further evaluating. Thus, the embodiment allows connecting a caller to a qualified callee, from a dynamic group of callees, by qualifying the callee from the callee's device.

Another embodiment further configures the set of callee conditions in a dependency hierarchy, wherein the dependency hierarchy provides that a dependent callee condition in the set of callee conditions is to be satisfied when a primary callee condition in the set of callee conditions has been satisfied. The embodiment sends, to the mobile devices associated with set of potential callees, the set of callee conditions. The embodiment causes as a first step, responsive to the sending, a mobile device associated with a first potential callee in the set of potential callees to determine whether a state information of the first potential callee satisfies the primary callee condition. The embodiment causes as a second step, responsive to first potential callee satisfying the primary callee condition, the mobile device associated with the first potential callee to determine whether the state information of the first potential callee satisfies the dependent callee condition. The embodiment causes the mobile device associated with the first potential callee, responsive to determining that the state information of the first potential callee satisfies the dependent callee condition, to return an evaluation that the first potential callee satisfies the set of callee conditions. Thus, the embodiment allows connecting a caller to a qualified callee, from a dynamic group of callees, by qualifying the callee by causing the callee's device to perform a multi-step qualification process at the callee's device.

Another embodiment further receives the set of potential callees at the device of the caller. The embodiment determines that different states of different potential callees in the set of potential callees satisfy a callee condition in the set of callee conditions to different degrees of satisfaction. The embodiment selects, at the device of the caller, the first subset of potential callees such that each potential callee in the subset satisfies the callee condition to a corresponding degree that exceeds a threshold degree of satisfaction of the callee condition, wherein the subset of potential callees includes the callee. Thus, even though the callees may be unknown to the caller and transient at the location, the embodiment allows the caller to apply one or more selection criteria in connecting with those callees.

In another embodiment, the mobile device has an associated identifier, and wherein the callee, the mobile device, and the identifier change at the location at a second time. Thus, the embodiment allows connecting a caller to call a transient callee who is present at the given location only for a period.

In another embodiment, an identifying information of any potential callee in the first subset of potential callees is unknown to the caller, and wherein an identifier of any mobile device of any potential callee in the first subset of potential callees is also unknown to the caller. Thus, the embodiment allows connecting a caller to an unknown callee having a device with an unknown identifier, only by virtue of the callee's presence at the given location and satisfying a callee condition.

Another embodiment includes a computer usable program product comprising a computer readable storage device including computer usable code for location-based communication with mobile devices. Thus, the embodiment creates a software product that is usable to facilitate location calls.

Another embodiment includes a data processing system for location-based communication with mobile devices. Thus, the embodiment creates a system that is usable to facilitate location calls.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
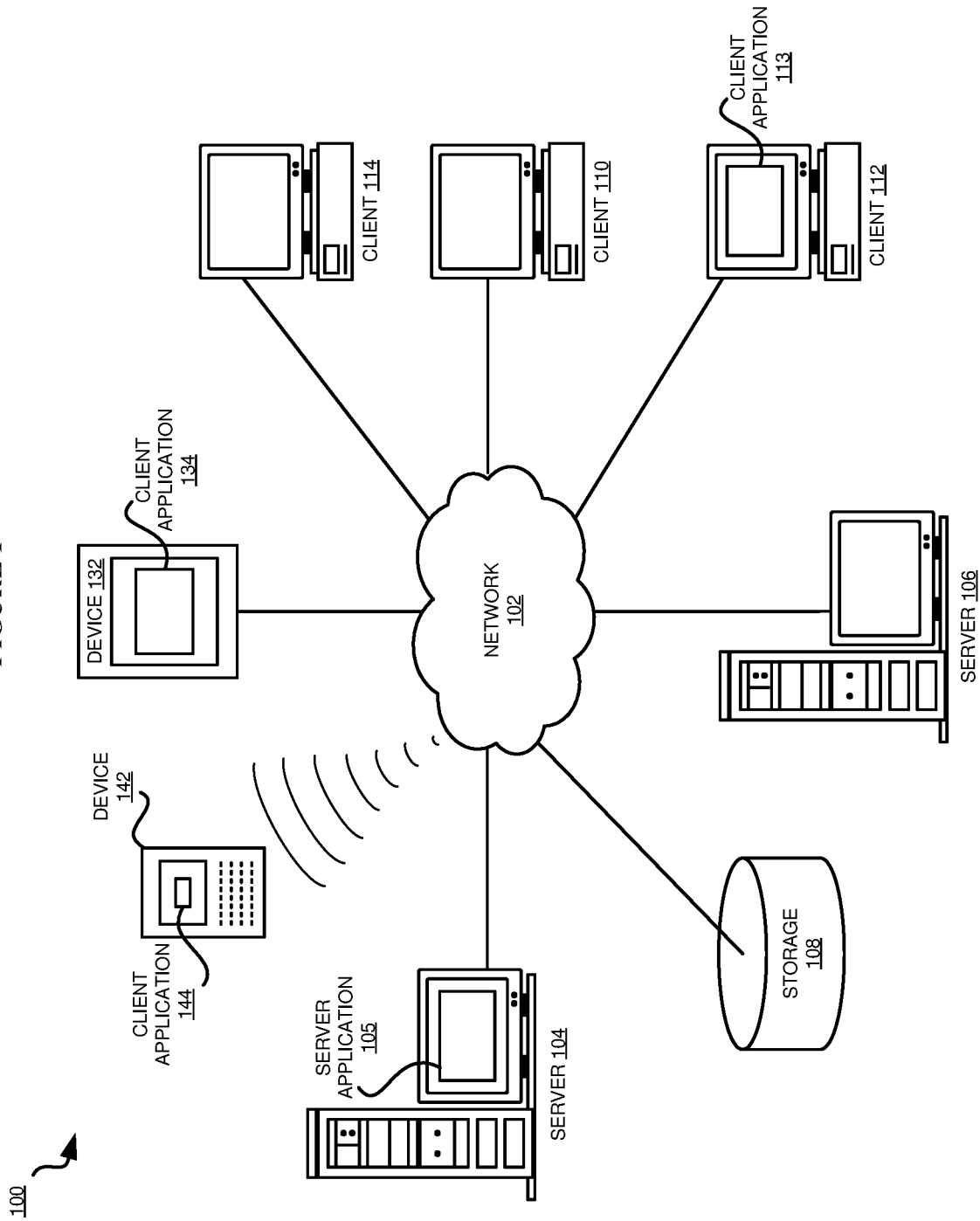
FIG. 1 depicts a block diagram of a network of data processing systems in which illustrative embodiments may be implemented.

The illustrative embodiments used to describe the invention generally address and solve the above-described problems and other problems related to calling one or more transient and unknown callees who are qualified for the call according to one or more callee conditions. The illustrative embodiments provide a method, system, and computer program product for callee condition based communication with mobile devices.

Within the scope of the illustrative embodiments, a location call is a call placed by one caller to one or more transient and unknown callees based on the callees' location and one or more callee conditions. From the caller's perspective, the location call is an outbound location call. From a callee's perspective, the location call is an inbound location call.

Within the scope of the illustrative embodiments, a location includes a precisely specified geographical point, a description of a structure or landmark located in a geographical region, a defined and bound geographical area, a geographical point or area that meets a criterion or condition, or some combination thereof.

An embodiment can be implemented as an application to execute on a mobile device. One embodiment enables a caller to place an outbound location call. Another embodiment enables a callee to respond to, accept, or otherwise handle an incoming location call. Another embodiment is configured to facilitate features described with respect to both—outbound location calls and inbound location calls. Another embodiment is configured to facilitate the callee condition evaluation at a service provider system.

An embodiment detects that the caller wishes to initiate a location call. For example, a caller selecting an area or a location on a map application triggers the detection that the caller wishes to initiate a location call. For example, the caller may point to, or draw on a map presentation to select an area or a location. A profile configuration of the caller or another selection tool allows the caller to specify the size of the area, such as by selecting a default or specified radius from the pointed-to location. For example, when the caller points to a location on a map, a pre-configured preference selects an area of n feet radius centered at the selected location. As another example, when the user selects an office building, the entire office campus, or a pre-defined area therein, may be selected.

According to another embodiment, a caller inputting a description of an area or a location, such as via a natural language interface, triggers the detection that the caller wishes to initiate a location call. For example, a caller can speak a description into an audio input interface, type a question in a natural language, such as, for example, "who is at the office building and has access to my office where I forgot the packet that needed to be shipped?" or "call someone who was a designated driver at the Smith party yesterday," or "Find anyone, but not a law enforcement person, not a rescue team member, and not an insurance related individual, who saw John Doe get into an accident at the intersection of First street and Avenue K."

According to another embodiment, a caller selecting or highlighting a description of an area or a location, such as on a calendar application, triggers the detection that the caller wishes to initiate a location call. For example, if the caller selects a meeting on the caller's calendar, a location of the meeting is automatically selected. One or more callee condition can be associated with the location call in a suitable manner, such as by speaking, typing, or selecting a callee condition.

A profile configuration of the caller or another selection tool allows the caller to specify when such an input is to be construed as specifying a location for a location call, a callee condition, or both. For example, the caller may configure in the profile that when the caller provides an input in specific one or more applications to indicate a preferred state of a person, the input should be construed as a callee condition for a location call.

According to another embodiment, a caller expressly inputting a description of a callee condition, such as via a natural language interface, triggers the detection that the caller wishes to initiate a location call to one or more callees who qualify according to the one or more callee conditions. An embodiment receives, derives, or deduces the intended location of the call. For example, in the example where the caller inputs, "who is at the office building and has access to my office where I forgot the packet that needed to be shipped?" the location of the call is indirectly provided by the caller as "the office where I forgot the packet that needed to be shipped". An embodiment resolves "the office where I forgot the packet that needed to be shipped" as one of the several office spaces used by the caller, but where the caller was present yesterday according to an email that the caller sent yesterday using an email address associated with that particular office space. The embodiment resolves the time a callee has to be present at that office space as "now" because the caller's input asks "who is present . . . " in the present tense.

In another example, where the caller inputs, "call someone who was a designated driver at the Smith party yesterday," the location is implied—the location of the Smith party yesterday—and an embodiment uses other data, such as a venue information from a party invitation on the caller's calendar. The embodiment resolves the time a callee has to be present at that party as "the time of the party" because the caller's input asks "who was a designated driver . . . " in the past tense.

As another example, when the caller specifies, "Find anyone, but not a law enforcement person, not a rescue team member, and not an insurance related individual, who saw John Doe get into an accident at the intersection of First street and Avenue K," an embodiment identifies the intersection of First street and Avenue K as the location. The embodiment resolves the time a callee has to be present at that intersection as "the time of the accident" because the caller's input asks "who saw . . . " in the past tense.

As another example, the caller may specify, "call anyone from my golfer friends who will arrive at the golf club this evening, but not the first two golfer friends to arrive, to ask if our preferred tee time is still available." An embodiment identifies the golf club as the location. The embodiment resolves the time a callee has to be present at that intersection as "this evening" because the caller's input asks "who will arrive . . . " in the future tense.

These examples of determining from a caller's actions a location, a time of presence at the location, and one or more callee conditions to select a callee, are not intended to be limiting. From this disclosure, those of ordinary skill in the art will be able to conceive many other ways of determining similar information from these and other actions of a caller and the same are contemplated within the scope of the illustrative embodiments.

An embodiment further presents the caller a user interface from where the caller can configure any number of callee conditions for the outbound location call, such as additional callee conditions, a dependency hierarchy of the callee conditions, a manner of presenting the callee conditions, a manner of evaluating the callee conditions, or some combination thereof. For example, according to one embodiment, the caller can specify that in a first increment, only a first subset of a set of callee conditions should be presented first to the set of callees who are determined to be located at the desired time and location. From the set of callees, a first subset of callees should be selected who also qualify based on satisfying the first subset of callee conditions. Then, in a second increment, a second subset of the callee conditions should be presented to the first subset of the qualified callees. A subset of the first subset of qualified callees, who also qualify based on satisfying the second subset of callee conditions, should be presented with a third subset of callee conditions in a third increment, and so on, until a subset of callees is reached who qualify according to all or a selected subset of callee conditions presented in this incremental manner.

Such a manner of incrementally presenting callee conditions in increments to progressively reducing set of potential callees according to an embodiment operates by using several communications for the several increments between the caller's device, and one or more devices of the potential callees. In one embodiment, a potential callee need not know about the occurrence of these communications, such as when the callee's device has sufficient callee-specific information to evaluate whether the callee qualifies at any particular increment of the callee conditions. In another embodiment, a potential callee is prompted by the callee's device for obtaining callee-specific information, to evaluate whether the callee qualifies at any particular increment of the callee conditions.

According to another embodiment, the caller can specify that the entire set of callee conditions should be presented to the set of callees who are determined to be located at the desired time and location. A device associated with each callee evaluates the set of callee conditions according to the dependency hierarchy that is also presented with the set of callee conditions to the callee devices. The devices of those callees who qualify based on satisfying all or a selected subset of callee conditions are selected for the location call.

Such a manner of incrementally presenting callee conditions in increments to progressively reducing set of potential callees according to an embodiment operates by using several communications for the several increments between the caller's device, and one or more devices of the potential callees. In one embodiment, a potential callee need not know about the occurrence of these communications, such as when the callee's device has sufficient callee-specific information to evaluate whether the callee qualifies at any particular increment of the callee conditions. In another embodiment, a potential callee is prompted by the callee's device for obtaining callee-specific information, to evaluate whether the callee qualifies at any particular increment of the callee conditions.

When the entire set of callee conditions is downloaded or sent to a set of callee devices, in one embodiment, a potential callee may not be made aware of the processing of the callee conditions if an embodiment executing in the callee's device has sufficient callee-specific information to evaluate whether the callee qualifies according to the callee conditions. In another embodiment, a potential callee is prompted by the callee's device for obtaining callee-specific information, to evaluate whether the callee qualifies according to one or more of the callee conditions.

As another example, in another embodiment, the caller's device sends the set of callee conditions to a service provider's system, such as to a server application executing an embodiment. The server application then incrementally presents subsets of the set of callee conditions to progressively reducing set of potential callees who qualify up to the previous increment of callee conditions. When a final reduced subset of callees is reached, who qualify by satisfying all or a selected subset of callee conditions, the server application facilitates the location call between the caller and the final reduced subset of callees.

In such an embodiment, several communications for the several increments occur between the service server application and one or more devices of the potential callees. The callees' identities or callee device identifying information is not revealed to the caller in such an embodiment. Again, a potential callee may or may not know about the occurrence of these communications, depending on whether the callee's device has sufficient callee-specific information to evaluate whether the callee qualifies at any particular increment of the callee conditions.

According to one embodiment, the caller can specify how many qualifying potential callees should be present at the past location. According to another embodiment, the caller can specify how many qualified potential callees should respond to the location call. According to another embodiment, the caller can specify a timeout period within which a qualified potential callee should respond; otherwise the location call should be terminated. According to another embodiment, the caller can specify the request the caller has for a qualified callee who answers the location call, e.g., a text message that should be presented to the qualified callee who accepts the location call.

A server application maintains historical records of the traversals of the devices of the caller and potential callees. Given a location and a time of presence of a potential callee, the server application can select those devices, and the callees associated therewith, who satisfy the time and location requirement.

The server application prepares a callee list. The callee list includes the selected mobile devices and their associated identifiers or numbers. Each callee associated with an identified mobile device is a potential callee who satisfies the time and place of the location call. From this list of callees, the callees can be qualified according to a set of callee conditions, and the list can be reduced, in any of the manners described herein.

In one embodiment, where the caller's device presents the callee conditions to callees as a set or increment, the server application provides the callee list to the application executing on the caller's device. In such an embodiment, an identity of a potential callee, an identifier or number of a potential callee's mobile device, a normalized form of the identity or identifier, or some combination thereof, are revealed to the caller. Even though the potential callees are unknown to the caller, the caller is able to select one or more potential callees, reject one or more callees, or both, based on which callee qualifies according to the callee conditions that have been presented up to that point in time.

As one example, assume that several callees are listed as potential callees on the list sent to the caller. Different potential callees may satisfy a callee condition differently, such as to different degrees, at different times, at different distances from a location, or some combination thereof. One non-limiting example of qualifying a potential callee from the list can be a degree to which that callee satisfies the callee condition.

Note that the selection of some potential callees from a callee list need not be an overt action on the part of the caller. In one embodiment, configuration information used by the embodiment can automatically evaluate whether a callee satisfies a callee condition, and select or reject a potential callee from a callee list, when the callee list is available from the service provider.

In another embodiment, the server application does not provide the callee list to the application executing on the caller's device, but selects one or more callees at the server application. The selection process on the server application can be similar to the selection process on the caller's device using incremental presentation and evaluation of callee conditions, as described above. In such an embodiment, an identity of a potential callee, an identifier or number of a potential callee's mobile device, or some combination thereof, are not revealed to the caller. The caller is not able to select or reject one or more potential callees, but the server application does the selection or rejection on the caller's behalf.

One or more callees, who satisfy the time, location, and one or more callee conditions of a past-related criterion, are selected in one of the manners described herein. An embodiment creates an instruction to initiate the location call. For example, one embodiment passes, as instructions to the server application, the list of selected qualified callees, if a selection was made by the caller from the callee list. As another example, another embodiment passes, as instructions to the server application, any data, such as a text message, that the caller has configured to provide to a qualified callee who accepts the location call.

Either to a caller-selected list of qualified potential callees when the caller selects some potential callees, or to all qualified potential callees in the callee list created by the server application, the server application initiates the location call using the instructions. Optionally, if an embodiment has provided any data to be transmitted to a callee, the server application passes such data to each callee mobile device with which the location call is initiated.

An embodiment executing in a callee's device evaluates a callee condition. For example, in a manner described herein, an embodiment in a callee's device uses available callee-specific information or information collected from the callee via a prompt, to evaluate a callee condition. The embodiment determines whether the callee satisfies the callee condition, a degree to which the callee satisfies the callee condition, or both. The embodiment passes the result of the evaluation to the caller's device or a server application, whichever sent the callee condition.

An embodiment allows additional inbound location call configuration for a callee. A user who could be a potential callee for a past location call can configure the embodiment with one or more preferences for the handling of such past location call. For example, a user can configure the embodiment with a black zone. A black zone is a location or area where the user does not want to participate in one or more location calls.

The user can further configure specific properties of the location calls in which the user does not want to participate while the user's mobile device is located in the black zone. A user can also configure a time period when the user does not participate in location calls while in the black zone. A user can also configure a time period, i.e., a Do Not Disturb (DND) period, when the user does not participate in location calls regardless of where the user is located. A user can also configure a whitelist (or a blacklist) of potential caller's, from any of whom a location call is acceptable (not acceptable).

An embodiment enables a potential callee to configure a combination of these and other similar configuration parameters. These examples of callee configurations are not intended to be limiting. From this disclosure, those of ordinary skill in the art will be able to conceive many other configuration parameters that can be configured in a similar manner, and the same are contemplated within the scope of the illustrative embodiments.

An embodiment further manages the mobile device associated with a potential callee, such as to manage the callee's privacy-related preferences. For example, a callee might want to not participate in a location call not only by rejecting a location call but also by configuring the mobile device in such a way that the mobile device will not be included in a callee list for a specified location. For example, one embodiment hides or otherwise prevents the mobile device's location to become known to the server application. Thus, when the server application does not have the location information of a mobile device, the server application cannot include the mobile device in a callee list. As another example, another embodiment masquerades the mobile device's location, such as by manipulating the device's location such that the device appears to be at a location other than the device's actual location.

An embodiment can manage the mobile device on which the embodiment is implemented such that the mobile device's behavior can be modified in a variety of ways. For example, an embodiment can modify the mobile device's behavior differently for different incoming location calls, based on a present location of the device when an location call is received, based on time when an location call is received, based on a source or caller of a location call (when the caller is identified to the callee), or some combination of these and other factors.

An embodiment further transmits one or more callee preferences described herein to a service provider. Such a transmission allows or prevents a server application from including the user's mobile device in a list of potential callees.

When an inbound location call is received at the mobile device, an embodiment allows a variety of call handling options to the callee. For example, the embodiment allows the callee to accept or answer the call, decline or reject the call, allows the call to fail, or manipulate a configuration parameter of the device such that the device no longer complies with a requirement of the location call.

If the callee accepts a location call, an embodiment further responds to the caller with any data that may be requested from the callee. For example, the embodiment can capture and transmit an image of a surrounding where the mobile device is present. As another example, an embodiment can transmit a message or a disclaimer to the caller before the callee and the caller communicate in the call. An embodiment can make these and other similarly purposed data transmissions at the beginning of the location call, during the location call, prior to a termination of the location call, or even after a location call has terminated.

For example, using an embodiment, a caller may wish to perform a poll. The caller may leave the poll open for five minutes after which the poll closes and the location call ends. The embodiment then summarizes the results of the poll and transmits to some or all callees. For example, the result data may be transmitted to only those callees who participated in the poll, or to all potential callees in the group. Such a transmission of the result data would be a transmission done after the location call terminates. Those of ordinary skill in the art will be able to conceive may other circumstances of data transmissions that occur at the beginning of the location call, during the location call, prior to a termination of the location call, or even after a location call has terminated, and the same are contemplated within the scope of the illustrative embodiments.

A method of an embodiment described herein, when implemented to execute on a device or data processing system, comprises substantial advancement of the functionality of that device or data processing system in calling a mobile device based on the device's location at a given time and further based on the satisfaction of one or more callee conditions. For example, prior-art requires that a caller be able to identify a callee either by an identity of the callee or by a fixed association of a telecommunication identifier, e.g., a phone number, with a location. An embodiment enables a caller to make a location call without knowing the identity of a callee at a location, without the location being associated with any particular telecommunication identifier, or both. Furthermore, an embodiment enables a caller to specify one or more callee conditions that a callee has to satisfy to qualify as a callee. Operating in a manner described herein, an embodiment performs callee condition based communication with mobile devices. Such manner of operating a telecommunication system is unavailable in presently available devices or data processing systems. Thus, a substantial advancement of such devices or data processing systems by executing a method of an embodiment facilitates callee condition based calls to a transient and dynamic set of callees based on a location of the set of callees.

The illustrative embodiments are described with respect to certain applications, circumstances, locations, areas, configurations and parameters, time periods, transmissions, callee conditions, methods and degrees of satisfaction of callee conditions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
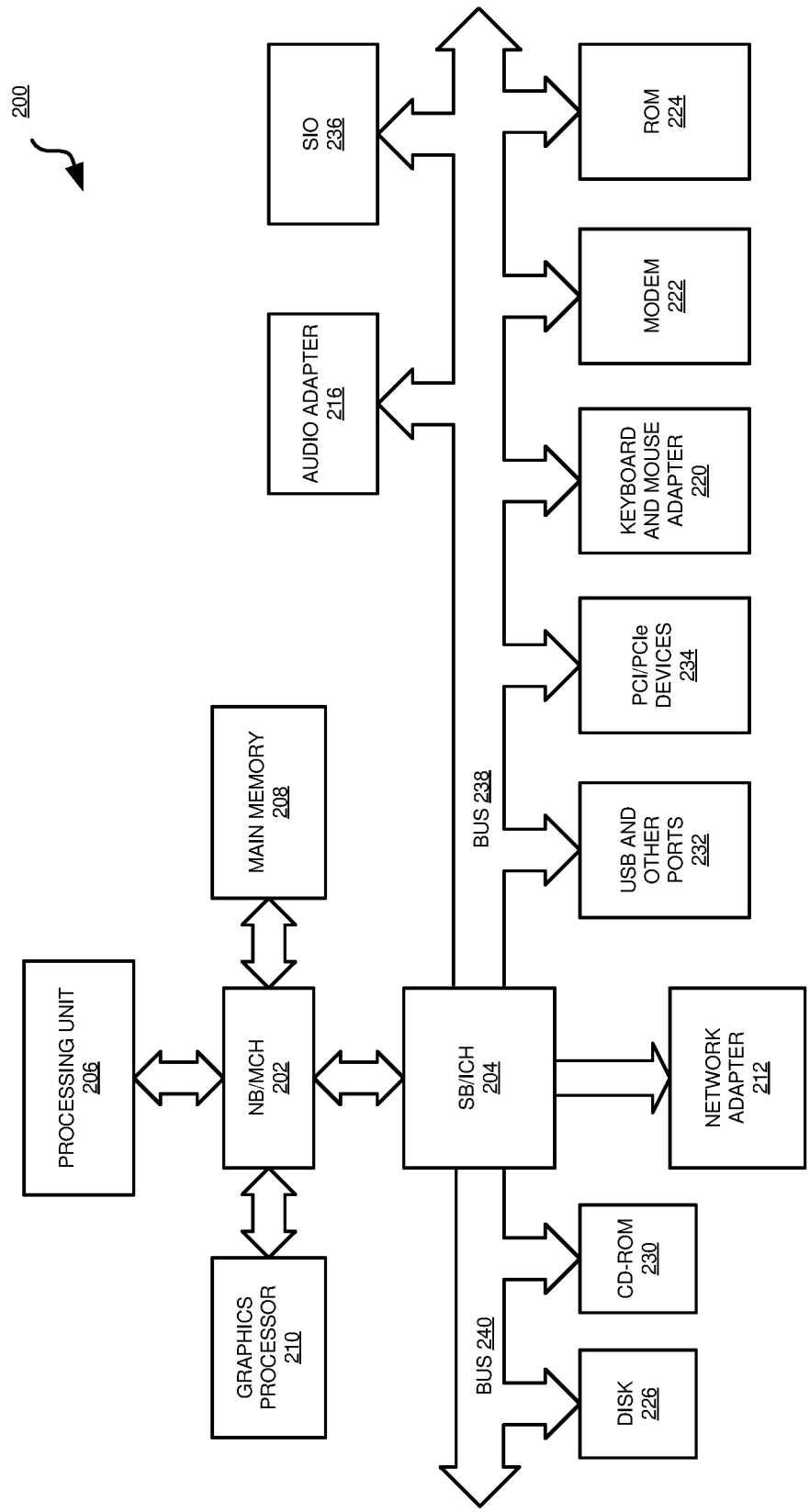
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wired communication links, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Device 132 is a mobile device according to an embodiment, e.g., a tablet computer. Device 142 is another example of a mobile device, such as a smartphone. Client 112 is an example of a telecommunication device, including but not limited to a mobile device. Client applications 113, 134, and 144 each implements an embodiment described herein. As a non-limiting example, client application 134 may implement certain callee oriented features of one or more embodiments described herein. As another non-limiting example, client application 144 may implement certain caller oriented features and certain callee oriented features of one or more embodiments described herein. As another non-limiting example, client application 113 may implement certain caller oriented features of one or more embodiments described herein. Generally, a client application can implement any combination of caller oriented features and callee oriented features without limitation. Server application 105 is an application that executes on the server-side of a service provider's network and operates according to an embodiment described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 and 142 in FIG. 1 in which computer usable program code or instructions implementing the processes of the illustrative embodiments may be located. Data processing system 200 is described as a computer only as an example, without being limited thereto. Implementations in the form of other devices, such as device 132 and 142 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as server application 105 in FIG. 1 and client applications 113, 134, and 144 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3A:
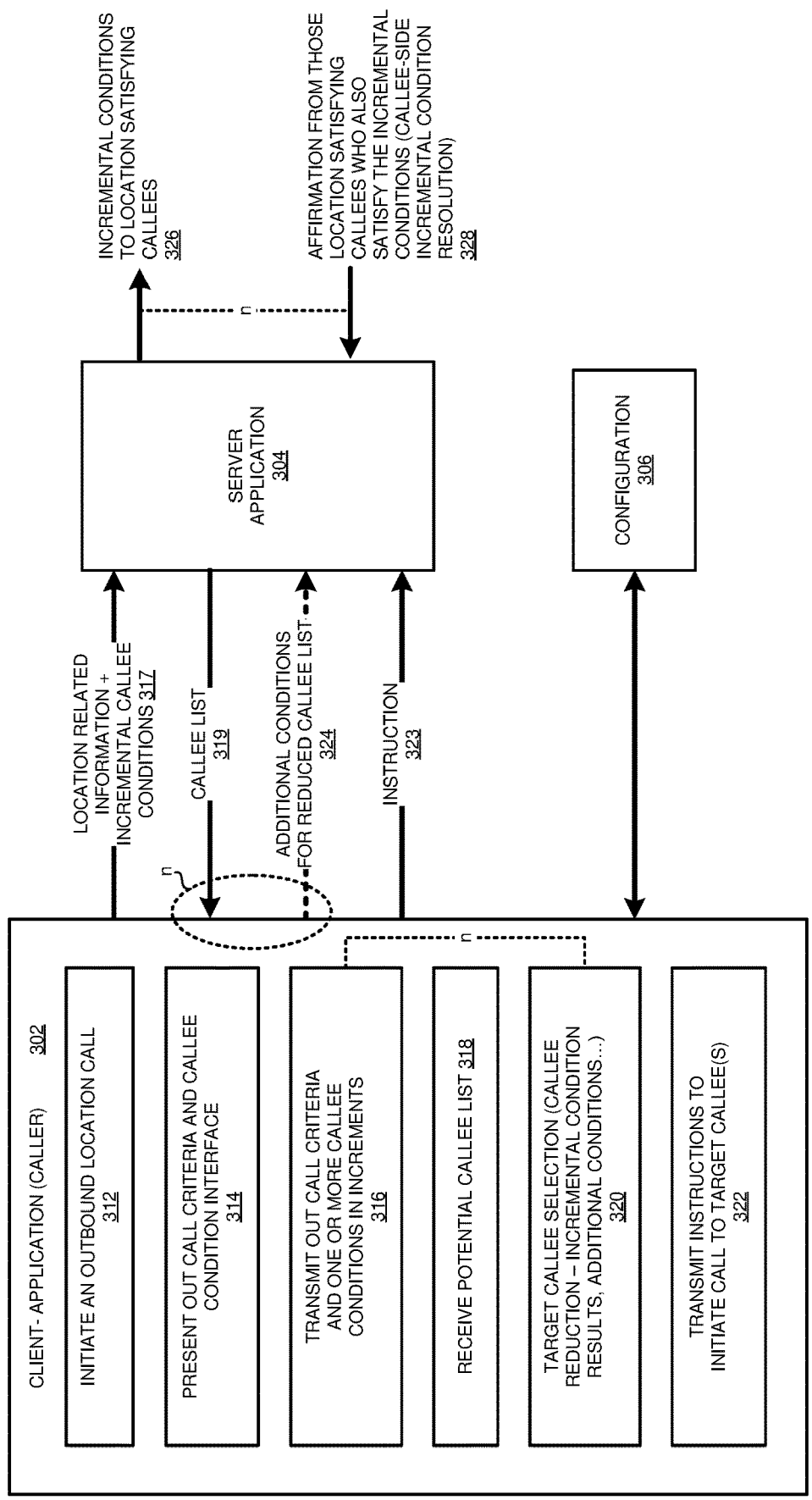
FIG. 3A depicts a block diagram of an example configuration for callee condition based communication with mobile devices in accordance with an illustrative embodiment.

With reference to FIG. 3A, this figure depicts a block diagram of an example configuration for callee condition based communication with mobile devices in accordance with an illustrative embodiment. Application 302 is an example of any of client applications 134, 144, or 113 in FIG. 1. Server application 304 is an example of server application 105 in FIG. 1.

Component 312 detects that a caller is initiating a location call. For example, component 312 detects that a map application has been opened, a meeting notice is presented, or a location is input in natural language, on the device where application 302 is executing.

In one embodiment, component 312 also detects that the caller is specifying a callee condition for a location call. For example, component 312 detects that the caller has provided an input at a certain application, the input includes a preferred state of a person, and the input should be construed as a callee condition in a manner described elsewhere in this disclosure.

Component 314 presents an outbound call criteria selection interface. Any parameters of the outbound location call can be specified using the interface presented by component 314. In some cases, component 314 saves a criterion that has been input by the caller on the interface as a preference in configuration 306. In some cases, component 314 presents as a pre-configured criterion, a preference that has been previously saved in configuration 306.

In one embodiment, component 314 presents an interface through which the caller can expressly specify or input a callee condition as well. For example, instead of component 312 detecting an input that includes a desired state of a callee being made at another application, component 314 presents an interface through which the caller can input the callee condition to be used with a location call. In one embodiment, the input with a desired state of a callee, as detected by component 312, can be used to pre-populate the interface presented by component 314. The caller can accept, reject, or modify the input for use as a callee condition for a location call.

Component 316 transmits the one or more outbound location call criteria (317) to server application 304. Optionally, as described elsewhere in this disclosure, when a callee's device (not shown) has to evaluate whether a callee condition has been satisfied, component 316 also sends the callee condition (317) detected or collected by component 312 and/or 314 to server application 304.

Specifically, in the configuration depicted in this figure, component 316 transmits a subset of callee conditions in an increment (or installment, or iteration) manner. Accordingly, in transmission 317, component 316 includes the subset of callee conditions that are to be evaluated for qualifying a potential callee.

When incremental callee conditions are included in transmission 317, server application 304 provides the incremental callee conditions (326) to those callees who satisfy the location and time requirements of the location call. From those callees who satisfy the location and time requirement, the devices of some (or all) callees who also satisfy incremental callee conditions 326, affirm (328) to server application 302 that their respective callees qualify according to incremental callee conditions 326.

Server application 304 prepares callee list 319. Callee list 319 includes those potential callees who meet the location and time requirement of the location call as well as satisfy the incremental callee conditions in transmission 317. When callee list 319 can be made available to application 302, component 318 receives callee list 319 from server application 304. In some cases, component 318 may prepare and send a request to server application 304 for callee list 319.

Component 320 enables the caller to select one or more potential callees from callee list 319. In some cases, component 320 automatically selects one or more potential callees, automatically rejects one or more potential callees, or both, based on a preference saved in configuration 306. For example, given a callee list, one embodiment can select a target callee from the callee list based on a degree to which the target callee satisfies the callee condition, the time at which the target callee satisfies the condition, the location from which the target callee satisfies the condition, or some combination thereof.

As an example, the embodiment may select one callee over another callee from the callee list if a degree to which the first callee satisfies the callee condition, the time at which the first callee satisfies the condition, the location from which the first callee satisfies the condition, or some combination thereof, is preferable over the degree to which the second callee satisfies the callee condition, the time at which the second callee satisfies the condition, the location from which the second callee satisfies the condition, or some combination thereof.

As another example, in another embodiment, given a callee list, the embodiment can identify whether anyone on the callee list is also in a contacts list accessible to the caller's device. From this disclosure, those of ordinary skill in the art will realize that a contact list, which may be a part of configuration 306, may be dynamically computed by application 304 based on information from the Internet such as a social media network. Generally, component 320 attempts to identify the best fitting callees from callee list according to the results of the incremental callee conditions and other factors that have been transmitted up to that point in time.

As described in this disclosure, several subsets of callee conditions may be transmitted incrementally to progressively reducing list of qualifying callees. When the callee conditions are configured for transmission in this manner, another subset of callee conditions is transmitted (324) to the reduced list of callees, which resulted from a previous transmission. Server application 304 forwards additional incremental callee conditions 324 as incremental callee conditions 326 to the devices of reduced set of callees. Some or all of the devices of the reduced set of callees affirm (328) that their respective callees qualify according to the next increment of conditions as well. Server application 304 forms and returns a revised and reduced list of callees (319). Component 318 receives the revised and reduced callee list 319. Component 320 again attempts to find the best fitting qualifying potential callees from the revised list. Component 320 again determines whether more increments of callee conditions are to be transmitted to the further reduced set of qualifying potential callees.

Generally, "n" such increments of these operations repeat, as depicted in this figure. The operations of components 316, 318, and 320, transmission 317 with transmission 324, forwarding 326 with affirmation 328, and callee list 319 are revised in this manner until all selected callee conditions are satisfied by a finally reduced subset of qualifying potential callees.

Component 322 prepares an instruction to initiate the outbound location call. For example, component 322 collects from the caller any messages that are to be delivered to a qualifying potential callee from the finally reduced subset of callees, any limitations on the location call such as a timeout or a number of responding callees, and transmits them as one or more instruction 323 to server application 304.

Figure 3B:
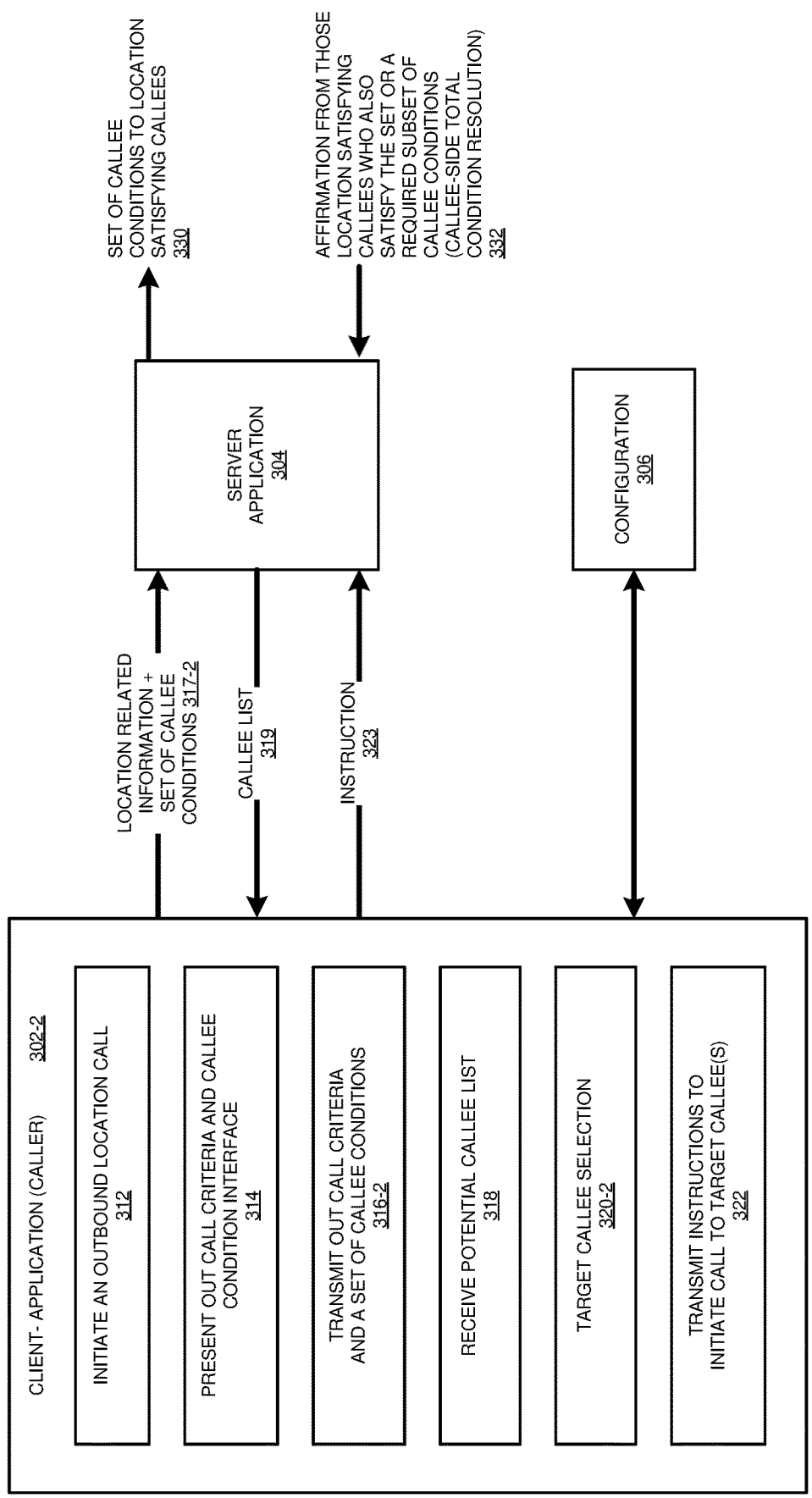
FIG. 3B depicts a block diagram of another example configuration for callee condition based communication with mobile devices in accordance with an illustrative embodiment.

With reference to FIG. 3B, this figure depicts a block diagram of another example configuration for callee condition based communication with mobile devices in accordance with an illustrative embodiment. Application 302-2 is an example of any of client applications 134, 144, or 113 in FIG. 1, and is a modified version of application 302 in FIG. 3A according to an embodiment. Server application 304 is an example of server application 105 in FIG. 1.

Configuration 306 is the same as configuration 306 in FIG. 3A. Components 312 and 314 operate as described with respect to FIG. 3A.

Component 316-2 is a variation of component 316 in FIG. 3A according to another embodiment. Component 316-2 transmits the one or more outbound location call criteria (317-2) to server application 304. Optionally, as described elsewhere in this disclosure, when a callee's device (not shown) has to evaluate whether a set of callee conditions has been satisfied, component 316-2 also sends the set of callee condition (317-2) detected or collected by component 312 and/or 314 to server application 304.

Specifically, in the configuration depicted in this figure, component 316-2 transmits a set of callee conditions to server 304. In one embodiment, the set of callee conditions in transmission 317-2 also includes an indication as to which of the selected callee conditions must be satisfied and which, if any, are optional to satisfy.

When a set of callee conditions are included in transmission 317-2, server application 304 provides the set of callee conditions (330) and any associated indications, to the devices (not shown) of those callees who satisfy the location and time requirements of the location call. From those callees who satisfy the location and time requirement, the devices of some (or all) callees who also satisfy the set or a selected subset of callee conditions 330, affirm (332) to server application 302-2 that their respective callees qualify according to set of callee conditions 330.

Server application 304 prepares callee list 319. Callee list 319 includes those potential callees who meet the location and time requirement of the location call as well as satisfy the set or a selected subset of the callee conditions in transmission 317-2. When callee list 319 can be made available to application 302-2, component 318 receives callee list 319 from server application 304. In some cases, component 318 may prepare and send a request to server application 304 for callee list 319.

Component 320-2 enables the caller to select one or more potential callees from callee list 319. In some cases, component 320 automatically selects one or more potential callees, automatically rejects one or more potential callees, or both, based on a preference saved in configuration 306. For example, given a callee list, one embodiment can select a target callee from the callee list based on a degree to which the target callee satisfies the callee condition, the time at which the target callee satisfies the condition, the location from which the target callee satisfies the condition, or some combination thereof.

As an example, the embodiment may select one callee over another callee from the callee list if a degree to which the first callee satisfies the callee condition, the time at which the first callee satisfies the condition, the location from which the first callee satisfies the condition, or some combination thereof, is preferable over the degree to which the second callee satisfies the callee condition, the time at which the second callee satisfies the condition, the location from which the second callee satisfies the condition, or some combination thereof. To enable such determinations at application 302-2, callee list 319 carries a degree to which a callee satisfies a callee condition, a time at which a callee satisfies a condition, a location from which a callee satisfies a condition, or some combination thereof.

As another example, in another embodiment, given a callee list, the embodiment can identify whether anyone on the callee list is also in a contacts list accessible to the caller's device. From this disclosure, those of ordinary skill in the art will realize that a contact list, which may be a part of configuration 306, may be dynamically computed by application 304 based on information from the Internet such as a social media network. Generally, component 320-2 attempts to identify the best fitting callees from callee list according to the results of the callee conditions and other factors.

Component 322 prepares an instruction to initiate the outbound location call. For example, component 322 collects from the caller any messages that are to be delivered to a qualifying potential callee from the finally reduced subset of callees, any limitations on the location call such as a timeout or a number of responding callees, and transmits them as one or more instruction 323 to server application 304.

Figure 3C:
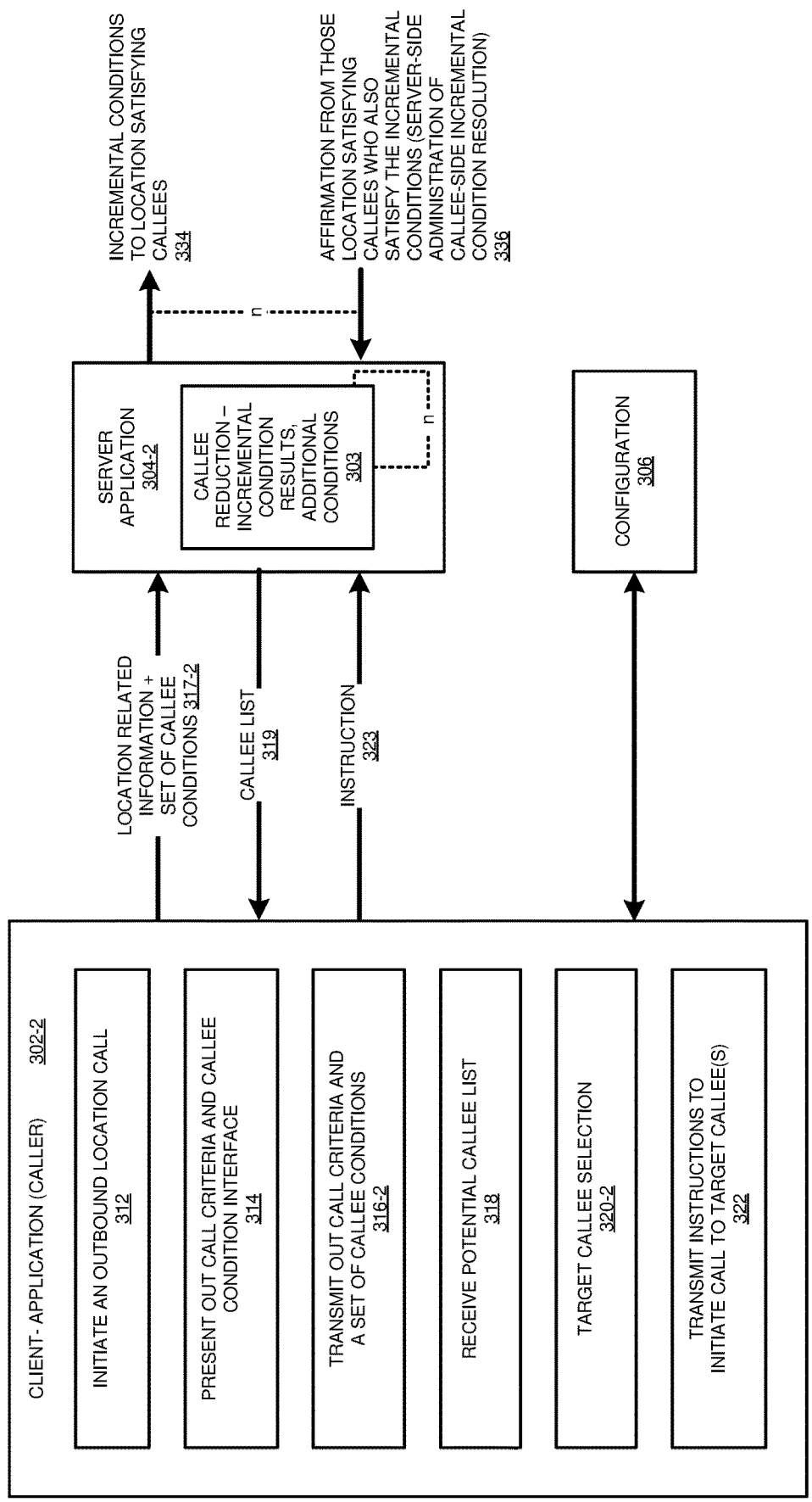
FIG. 3C depicts a block diagram of another example configuration for callee condition based communication with mobile devices in accordance with an illustrative embodiment.

With reference to FIG. 3C, this figure depicts a block diagram of another example configuration for callee condition based communication with mobile devices in accordance with an illustrative embodiment. Application 302-2 is an example of any of client applications 134, 144, or 113 in FIG. 1, and is a modified version of application 302 in FIG. 3A according to an embodiment. Server application 304-2 is an example of server application 105 in FIG. 1, and is a modified version of server application 304 in FIGS. 3A and 3B according to an embodiment.

Configuration 306 is the same as configuration 306 in FIGS. 3A and 3B. Components 312 and 314 operate as described with respect to FIGS. 3A and 3B.

Component 316-2 the same as component 316-2 in FIG. 3B. Component 316-2 transmits the one or more outbound location call criteria (317-2) to server application 304. Optionally, as described elsewhere in this disclosure, when server application 304-2 has to evaluate whether a set of callee conditions has been satisfied, component 316-2 also sends the set of callee condition (317-2) detected or collected by component 312 and/or 314 to server application 304.

Specifically, in the configuration depicted in this figure, component 316-2 transmits a set of callee conditions to server 304-2. In one embodiment, the set of callee conditions in transmission 317-2 also includes an indication as to which of the selected callee conditions must be satisfied and which, if any, are optional to satisfy.

When a set of callee conditions are included in transmission 317-2, server application 304-2 performs the incremental operation described with respect to component 320 in FIG. 3A.

Server application 304-2 saves the set of callee conditions in transmission 317 using component 303. Component 303 selects an increment of callee conditions from the saved set of callee conditions. Component 303 provides incremental callee conditions (334) to those callees who satisfy the location and time requirements of the location call. From those callees who satisfy the location and time requirement, the devices of some (or all) callees who also satisfy incremental callee conditions 334, affirm (336) to server application 302 that their respective callees qualify according to incremental callee conditions 334.

Server application 304 prepares a temporary callee list (not shown) of those potential callees who meet the location and time requirement of the location call as well as satisfy the incremental callee conditions 334. Component 303 selects one or more potential callees from this temporary callee list. For example, given a temporary callee list, one embodiment implemented in component 303 can select a target callee from the temporary callee list based on a degree to which the target callee satisfies the callee condition, the time at which the target callee satisfies the condition, the location from which the target callee satisfies the condition, or some combination thereof.

As an example, the embodiment in component 303 may select one callee over another callee from the callee list if a degree to which the first callee satisfies the callee condition, the time at which the first callee satisfies the condition, the location from which the first callee satisfies the condition, or some combination thereof, is preferable over the degree to which the second callee satisfies the callee condition, the time at which the second callee satisfies the condition, the location from which the second callee satisfies the condition, or some combination thereof. Generally, component 303 attempts to identify the best fitting callees from the temporary callee list according to the results of the incremental callee conditions 334 that have been transmitted up to that point in time.

As described in this disclosure, several subsets of callee conditions may be transmitted incrementally to progressively reducing list of qualifying callees. When the callee conditions are configured for transmission in this manner, another subset of callee conditions is transmitted (334) to the reduced list of callees, which resulted from a previous increment of callee conditions. Server application 304-2 sends additional incremental callee conditions 334 to the devices of reduced set of callees. Some or all of the devices of the reduced set of callees affirm (336) that their respective callees qualify according to the next increment of conditions as well. Server application 304-2 forms another temporary callee list, which is reduced from the previous temporary callee list. Component 303 receives the revised and reduced temporary callee list. Component 303 again attempts to find the best fitting qualifying potential callees from the revised list. Component 303 again determines whether more increments of callee conditions are to be transmitted to the further reduced set of qualifying potential callees.

Generally, "n" such increments of these operations repeat, as depicted in this figure. The operations of component 303 and transmission 334 with affirmation 336 are repeated through n increments in this manner until all selected callee conditions are satisfied by a finally reduced subset of qualifying potential callees.

The finally reduced subset of qualifying potential callees forms callee list 319. Server application 304-2 sends callee list 319. Component 318 receives callee list in the manner described with respect to FIG. 3A or 3B. Component 320-2 operates on callee list 319 in the manner described with respect to FIG. 3B. Component 322 sends instruction 323 in the manner described with respect to FIGS. 3A and 3B.

Figure 4:
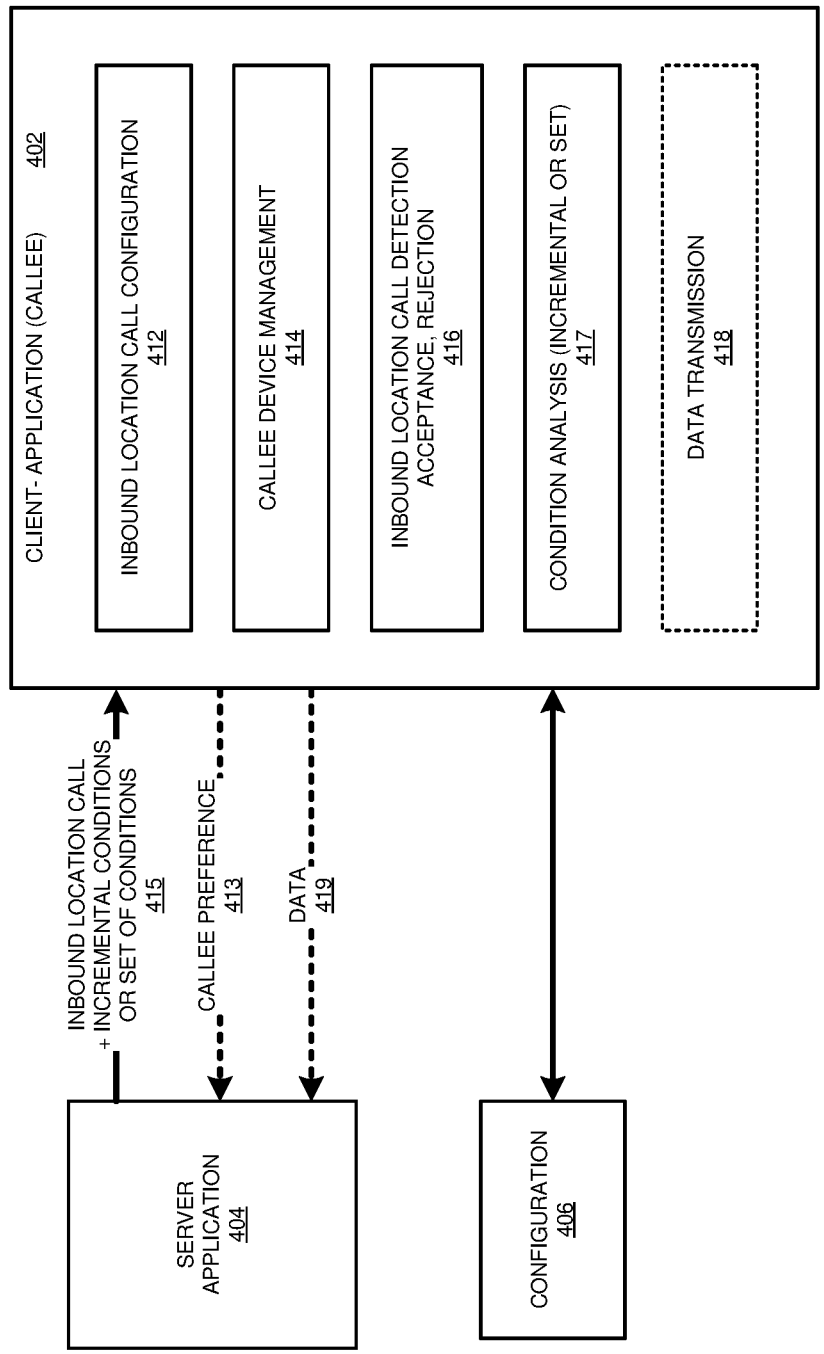
FIG. 4 depicts a block diagram of example callee oriented features for callee condition based communication with mobile devices in accordance with an illustrative embodiment.

With reference to FIG. 4, this figure depicts a block diagram of example callee oriented features for callee condition based communication with mobile devices in accordance with an illustrative embodiment. Application 402 is an example of any of client applications 134, 144, or 113 in FIG. 1. Application 402 can also be implemented together with the features of application 302 in FIG. 3, in the form of a single application. Server application 404 is an example of server application 304 in FIG. 3.

Component 412 allows a potential callee to configure application 402, the mobile device where application 402 is executing, or both, how the callee would like to handle an inbound location call. A configuration preference provided by the callee is saved in configuration 406. Component 412 may also present to the callee a parameter from configuration 406 as a default configuration or a previously saved preference of the callee. Component 412 may also alter a callee preference based on a time, a location of the callee's device, or a combination thereof, and update configuration 406 accordingly. Optionally, component 412 may send (413) one or more preferences to server application 404.

Component 414 configures the mobile device where application 402 is executing. Particularly, component 414 configures the mobile device to observe or enforce a black zone, DND and other periods, location hiding, location obfuscation or masquerading, and other device configurations described herein.

Server application 404 sends inbound location call 415, or an indication thereof, to application 402. For example, inbound location call 415 may result from instruction 323 sent from application 302 in FIG. 3.

Component 416 detects inbound location call 415. Component 416 accepts, rejects, or allows a failure, of call 415 according to callee preferences in configuration 406.

Component 417 receives a callee condition. The received callee condition may be in an increment of callee conditions from the caller-side, as in FIG. 3A, or from a server application, as in FIG. 3C. The received callee condition may also be in a set of callee conditions from the caller-side, as in FIG. 3B.

Component 417 determines whether the callee, who is associated with the device where client application 402 is operating, satisfies the callee condition. For example, in one embodiment, component 417 uses data saved in the device to analyze the callee condition and determine whether the data satisfies the callee condition. In another embodiment, component 417 prompts the callee to receive an input, and uses the input data to analyze the callee condition and determine whether the input data satisfies the callee condition. Component 417 associates with the callee a result of the callee condition, a time when the callee satisfies or fails the callee condition, and location where the callee satisfies or fails the callee condition. This information is returned to server application 304 or 304-2, caller-side application 302 or 302-2, or some combination thereof as described with respect to FIGS. 3A, 3B, and 3C.

Optionally, when data is requested by a caller or server application 404, as described elsewhere in this disclosure, component 418 sends data 418 to server application 404.

Figure 5:
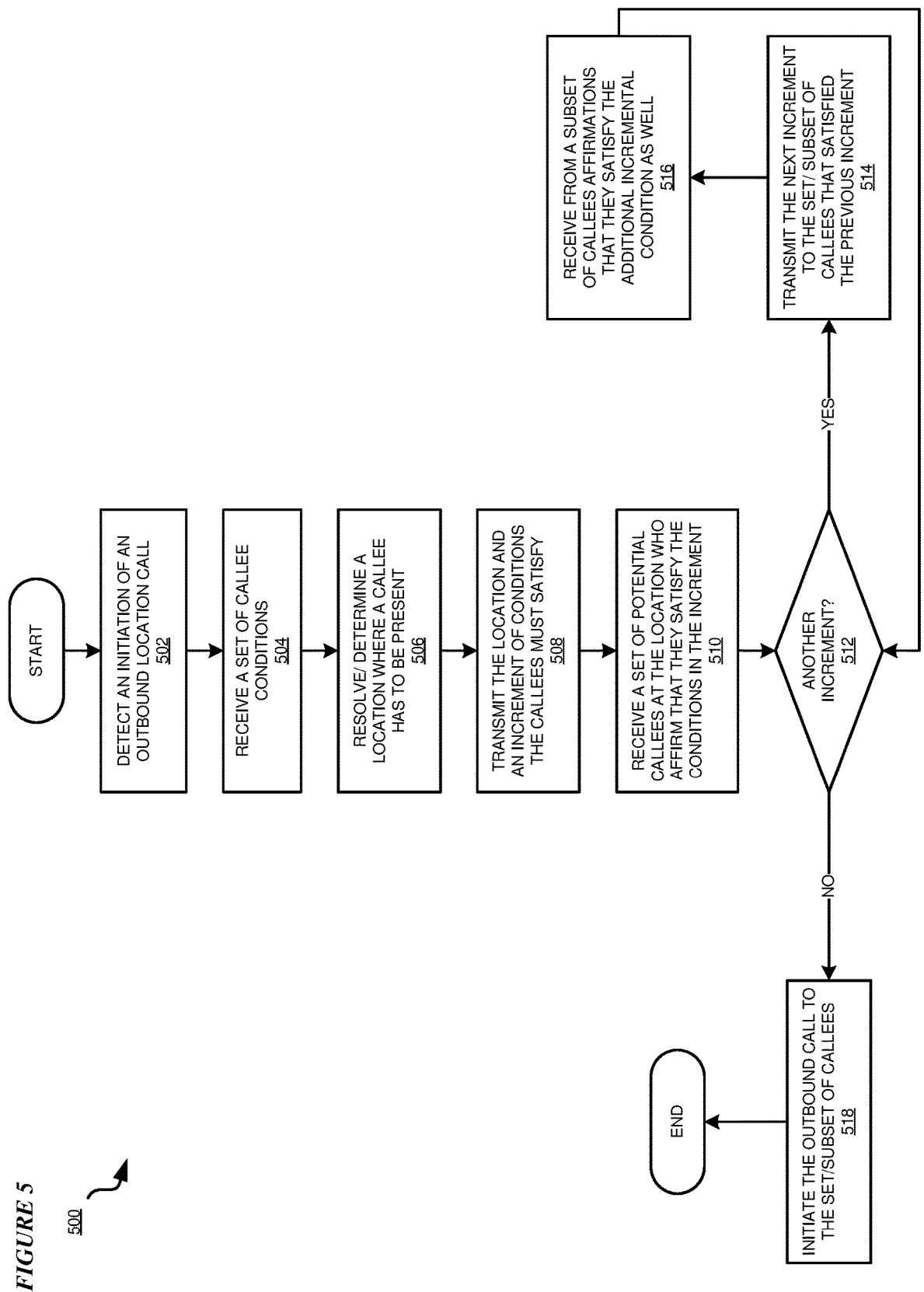
FIG. 5 depicts a flowchart of an example process for callee condition based communication with mobile devices in accordance with an illustrative embodiment.

With reference to FIG. 5, this figure depicts a flowchart of an example process for callee condition based communication with mobile devices in accordance with an illustrative embodiment. Process 500 can be implemented in application 302 in FIG. 3A. From this disclosure, those of ordinary skill in the art will be able to adapt process 500 to operate using application 302-2 in FIG. 3B, and such adaptation is contemplated within the scope of the illustrative embodiments. Also, from this disclosure, those of ordinary skill in the art will be able to adapt process 500 to operate using server application 304-2 in FIG. 3C, and such adaptation is contemplated within the scope of the illustrative embodiments.

The application detects an initiation of an outbound location call (block 502). The application receives a set of callee conditions for the outbound location call (block 504). Any number of past time related conditions can be specified in block 504.

The application determines or resolves a location where a callee has to be present to be a potential callee for the location call (block 506). The application transmits to a server application the location, a time of the presence at the location, and an increment of callee conditions for a callee to qualify for the location call (block 508). The application receives a set of qualifying potential callees who meet the location and time requirement of the location call, and who affirm that they satisfy the increment of callee conditions (block 510).

The application determines whether another increment of callee conditions has to be sent to the qualifying potential callees (block 512). If another increment of callee conditions has to be sent ("Yes" path of block 512), the application transmits the next increment to the set, or a selected subset of the qualifying potential callees (block 514). The application receives an affirmation from a subset of the qualifying potential callees that they satisfy the additional increment of callee conditions as well (block 516).

The application returns to block 512 thereafter to continue through n increments of callee conditions in this manner. If no additional increment of callee conditions has to be sent ("No" path of block 512), the application initiates the outbound location call to the set of finally reduced qualifying callees or a selected subset thereof, as the case may be (block 518). The application ends process 500 thereafter.

Figure 6:
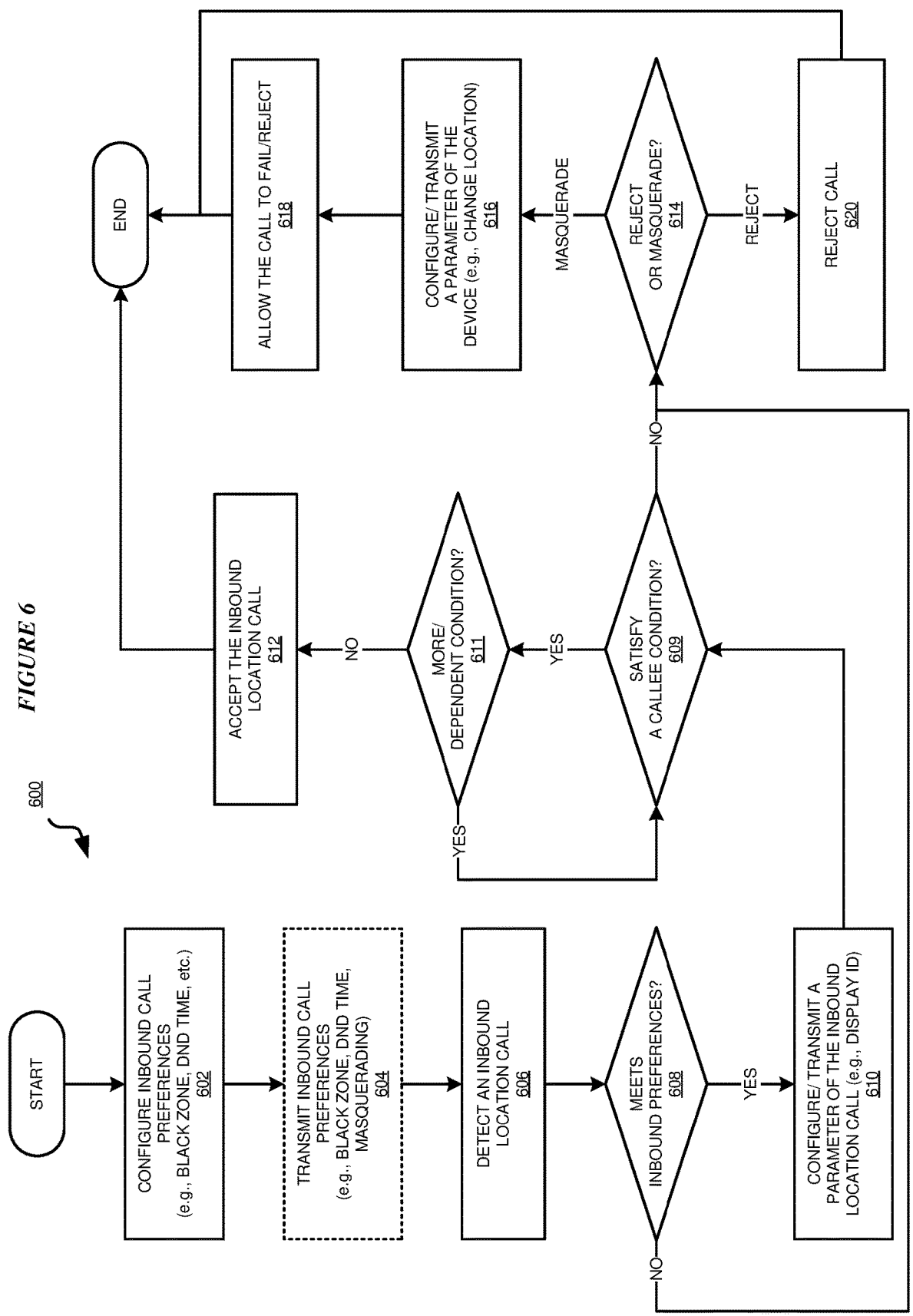
FIG. 6 depicts a flowchart of another example process for callee condition based communication with mobile devices in accordance with an illustrative embodiment.

With reference to FIG. 6, this figure depicts a flowchart of another example process for callee condition based communication with mobile devices in accordance with an illustrative embodiment. Process 600 can be implemented in application 402 in FIG. 4.

The application configures a preference for an inbound location call (block 602). The application optionally transmits one or more preferences to a server application, such as to server application 404 in FIG. 4 (block 604).

Many possible preferences can be configured in blocks 602 and 604. For example, one embodiment allows a potential callee to masquerade the location of the potential callee's device as being present everywhere, to wit, anywhere a caller might want to place a location call. The embodiment thus enables the potential callee to accept or reject a location call based on other preferences when the call is actually received.

As an example, masquerading the location such that the location of the callee meets any location criterion of the caller may be restricted to only some callers, such as a list of previous callers, known callers, or callers meeting certain criteria. Such masquerading allows the potential callee to pretend to be present wherever a caller expects some callee to be present. For example, a salesperson could masquerade the location of the salesperson's device to associate the salesperson's device with the locations of multiple sites of a company, such that the salesperson receives a location call regardless of which site a caller intends for a location call. These examples of preferences and configurations are not intended to be limiting. From this disclosure, those of ordinary skill in the art will be able to conceive many other preferences, configurations, and manners of masquerading, and the same are contemplated within the scope of the illustrative embodiments.

The application detects an inbound location call (block 606). The application determines whether the inbound location call meets a combination of the configured inbound preferences (block 608). If the inbound location call meets a combination of the configured inbound preferences ("Yes" path of block 608), the application configures a parameter to be used with the inbound location call (block 610). For example, the application configured the call such that the caller can receive information about the callee, such as the callee's identity, a number or identifier associated with the mobile device where the application is executing, a normalized form of the identity or the identifier, or other similarly purposed information. In some cases, the application may transmit the parameter configured in block 610 to a server application.

The application determines whether the data available to the application about the associated callee satisfies a callee condition (block 609). If the callee condition is satisfied ("Yes" path of block 609), the application further determines whether an additional or dependent callee condition is also to be evaluated (block 611). If an additional or dependent callee condition is also to be evaluated (Yes" path of block 611), the application returns to block 609 and evaluates the additional or dependent condition. If all callee conditions and any additional or dependent conditions are satisfied and no more conditions are remaining for evaluation ("No" path of block 611), the application accepts the inbound location call (block 612). The application ends process 600 thereafter.

If the inbound location call does not meet a combination of the configured inbound preferences ("No" path of block 608), or when the application fails to satisfy a callee condition ("No" path of block 609), the application determines whether to reject the call or masquerade a device location to avoid the call (block 614).

If the application decides to masquerade a device feature, such as the location of the device ("Masquerade" path of block 614), the application configures and/or transmits a changed parameter of the mobile device (block 616). The application then allows the inbound location call to fail (block 618). The application ends process 600 thereafter.

If the application decides to reject the call ("Reject" path of block 614), the application rejects the inbound location call (block 620). The application ends process 600 thereafter.

Thus, a computer implemented method, system or apparatus, and computer program product are provided in the illustrative embodiments for callee condition based communication with mobile devices. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for location-based communication with mobile devices, the method comprising:
   receiving, at a device associated with a caller, a set of callee conditions to call a location, wherein a callee condition in the set of callee conditions has to be satisfied by a callee using a state information of the callee, wherein the state information of the callee is distinct from the location and a time of the callee's presence at the location;
   evaluating that each of the mobile devices that is associated with each potential callee in a first subset of a set of potential callees has been present at the location at a specified time;
   further evaluating that said each potential callee in the first subset of the set of potential callees satisfies the set of callee conditions;
   receiving, at the device associated with the caller, an instruction for making a telecommunication call to a mobile device of a potential callee in the first subset of the set of potential callees; and
   initiating, using a processor and a memory in the device associated with the caller, the telecommunication call to the mobile devices that are associated with the first subset of the set of potential callees.

2. The method of claim 1, further comprising:
   configuring the set of callee conditions in a dependency hierarchy, wherein the dependency hierarchy provides that a dependent callee condition in the set of callee conditions is to be satisfied when a primary callee condition in the set of callee conditions has been satisfied;
   sending as a first step, to the mobile devices associated with the set of potential callees, the primary callee condition;
   determining that a second subset of the set of potential callees satisfies the primary callee condition but a third subset of the set of potential callees fails to satisfy the primary callee condition;

sending as a second step, responsive to the determining, only to the mobile devices associated with second subset of potential callees, the dependent callee condition; and selecting, as the first subset of potential callees, those potential callees from the second subset who satisfy the dependent callee condition.

3. The method of claim 2, wherein the sending as the first step occurs from the device associated with the caller.

4. The method of claim 2, further comprising: transmitting the set of callee conditions to a server application in a service provider's system, wherein the sending as the first step occurs from the server application.

5. The method of claim 2, further comprising:
causing a mobile device of a potential callee in the first subset to evaluate the potential callee in the first subset of the set of potential callees satisfies the primary callee condition and the dependent callee condition, the causing being a part of the further evaluating.

6. The method of claim 1, further comprising:
configuring the set of callee conditions in a dependency hierarchy, wherein the dependency hierarchy provides that a dependent callee condition in the set of callee conditions is to be satisfied when a primary callee condition in the set of callee conditions has been satisfied;

sending, to the mobile devices associated with the set of potential callees, the set of callee conditions;

causing as a first step, responsive to the sending, a mobile device associated with a first potential callee in the set of potential callees to determine whether a state information of the first potential callee satisfies the primary callee condition;

causing as a second step, responsive to first potential callee satisfying the primary callee condition, the mobile device associated with the first potential callee to determine whether the state information of the first potential callee satisfies the dependent callee condition; and causing the mobile device associated with the first potential callee, responsive to determining that the state information of the first potential callee satisfies the dependent callee condition, to return an evaluation that the first potential callee satisfies the set of callee conditions.

7. The method of claim 1, further comprising:
receiving the set of potential callees at the device of the caller;

determining that different states of different potential callees in the set of potential callees satisfy a callee condition in the set of callee conditions to different degrees of satisfaction; and selecting, at the device of the caller, the first subset of the set of potential callees such that each potential callee in the first subset of the set of potential callees satisfies the callee condition to a corresponding degree that exceeds a threshold degree of satisfaction of the callee condition, wherein the first subset of the set of potential callees includes the callee.

8. The method of claim 1, wherein the mobile device has an associated identifier, and wherein the callee, the mobile device, and the identifier change at the location at a second time.

9. The method of claim 1, wherein an identifying information of any potential callee in the first subset of the set of potential callees is unknown to the caller, and wherein an identifier of any mobile device of any potential callee in the first subset of the set of potential callees is also unknown to the caller.

10. A computer usable program product comprising a computer readable storage device including computer usable code for location-based communication with mobile devices, the computer usable code comprising:

computer usable code for receiving, at a device associated with a caller, a set of callee conditions to call a location, wherein a callee condition in the set of callee conditions has to be satisfied by a callee using a state information of the callee, wherein the state information of the callee is distinct from the location and a time of the callee's presence at the location;

computer usable code for evaluating that each of the mobile devices associated with each potential callee in a first subset of a set of potential callees has been present at the location at a specified time;

computer usable code for further evaluating that each potential callee in the first subset of the set of potential callees satisfies the set of callee conditions;

computer usable code for receiving, at the device associated with the caller, an instruction for making a telecommunication call to a mobile device of a potential callee in the first subset of the set of potential callees; and computer usable code for initiating, using a processor and a memory in the device associated with the caller, the telecommunication call to the mobile devices associated with the first subset of the set of potential callees.

11. The computer usable program product of claim 10, further comprising:

computer usable code for configuring the set of callee conditions in a dependency hierarchy, wherein the dependency hierarchy provides that a dependent callee condition in the set of callee conditions is to be satisfied when a primary callee condition in the set of callee conditions has been satisfied;

computer usable code for sending as a first step, to the mobile devices associated with the set of potential callees, the primary callee condition;

computer usable code for determining that a second subset of the set of potential callees satisfies the primary callee condition but a third subset of the set of potential callees fails to satisfy the primary callee condition; computer usable code for sending as a second step, responsive to the determining, only to the mobile devices associated with the second subset of potential callees, the dependent callee condition; and computer usable code for selecting, as the first subset of the set of potential callees, those potential callees from the second subset who satisfy the dependent callee condition.

12. The computer usable program product of claim 11, wherein the sending as the first step occurs from the device associated with the caller.

13. The computer usable program product of claim 11, further comprising:

computer usable code for transmitting the set of callee conditions to a server application in a service provider's system, wherein the sending as the first step occurs from the server application.

14. The computer usable program product of claim 11, further comprising:

computer usable code for causing a mobile device of a potential callee in the first subset to evaluate the potential callee in the first subset of the set of potential callees satisfies the primary callee condition and the dependent callee condition, the causing being a part of the further evaluating.

15. The computer usable program product of claim 10, further comprising:
computer usable code for configuring the set of callee conditions in a dependency hierarchy, wherein the dependency hierarchy provides that a dependent callee condition in the set of callee conditions is to be satisfied when a primary callee condition in the set of callee conditions has been satisfied; computer usable code for sending, to the mobile devices associated with the set of potential callees, the set of callee conditions;
computer usable code for causing as a first step, responsive to the sending, a mobile device associated with a first potential callee in the set of potential callees to determine whether a state information of the first potential callee satisfies the primary callee condition;
computer usable code for causing as a second step, responsive to first potential callee satisfying the primary callee condition, the mobile device associated with the first potential callee to determine whether the state information of the first potential callee satisfies the dependent callee condition; and
computer usable code for causing the mobile device associated with the first potential callee, responsive to determining that the state information of the first potential callee satisfies the dependent callee condition, to return an evaluation that the first potential callee satisfies the set of callee conditions.

16. The computer usable program product of claim 10, further comprising:
computer usable code for receiving the set of potential callees at the device of the caller;
computer usable code for determining that different states of different potential callees in the set of potential callees satisfy a callee condition in the set of callee conditions to different degrees of satisfaction; and
computer usable code for selecting, at the device of the caller, the first subset of the set of potential callees such that each potential callee in the first subset of the set of potential callees satisfies the callee condition to a corresponding degree that exceeds a threshold degree of satisfaction of the callee condition, wherein the first subset of the set of potential callees includes the callee.

17. The computer usable program product of claim 10, wherein the mobile device has an associated identifier, and wherein the callee, the mobile device, and the identifier change at the location at a second time.

18. The computer usable program product of claim 10, wherein the computer usable code is stored in a computer readable storage device in a data processing system, and wherein the computer usable code is transferred over a network from a remote data processing system.

19. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

20. A data processing system for location-based communication with mobile devices, the data processing system comprising:
a storage device, wherein the storage device stores computer usable program code; and
a processor, wherein the processor executes the computer usable program code, and wherein the computer usable program code comprises:
computer usable code for receiving, at a device associated with a caller, a set of callee conditions to call a location, wherein a callee condition in the set of callee conditions has to be satisfied by a callee using a state information of the callee, wherein the state information of the callee is distinct from the location and a time of the callee's presence at the location;
computer usable code for evaluating that each of the mobile devices that is associated with each potential callee in a first subset of a set of potential callees has been present at the location at a specified time;
computer usable code for further evaluating that each potential callee in the first subset of the set of potential callees satisfies the set of callee conditions; computer usable code for receiving, at the device associated with the caller, an instruction for making a telecommunication call to a mobile device of a potential callee in the first subset of the set of potential callees; and
computer usable code for initiating, using the processor and the memory in the device associated with the caller, the telecommunication call to mobile devices associated with the first subset of the set of potential callees.

* * * * *